United States Patent
Kanade et al.

(10) Patent No.: US 8,022,977 B2
(45) Date of Patent: Sep. 20, 2011

(54) CAMERA PLACED BEHIND A DISPLAY WITH A TRANSPARENT BACKLIGHT

(75) Inventors: Udayan Kanade, Pune (IN); Balaji Ganapathy, Pune (IN)

(73) Assignee: I2iC Corporation, Foster City, CA (US)

( * ) Notice: Subject to any disclaimer, the term of this patent is extended or adjusted under 35 U.S.C. 154(b) by 1093 days.

(21) Appl. No.: 11/549,851

(22) Filed: Oct. 16, 2006

(65) Prior Publication Data

US 2007/0120879 A1     May 31, 2007

(30) Foreign Application Priority Data

Oct. 17, 2005    (IN) .......................... 1300/MUM/2005

(51) Int. Cl.
*H04N 7/14* (2006.01)
*G02F 1/33* (2006.01)
*G06F 3/038* (2006.01)

(52) U.S. Cl. ...................... 348/14.07; 349/116; 345/207

(58) Field of Classification Search ........................ None
See application file for complete search history.

(56) References Cited

U.S. PATENT DOCUMENTS

| | | | |
|---|---|---|---|
| 4,400,725 A * | 8/1983 | Tanigaki ..................... | 348/14.16 |
| 5,025,314 A * | 6/1991 | Tang et al. ................. | 348/14.08 |
| 5,159,445 A * | 10/1992 | Gitlin et al. ................ | 348/14.01 |
| 5,187,611 A | 2/1993 | White et al. | |
| 5,243,413 A * | 9/1993 | Gitlin et al. ................... | 348/269 |
| 5,539,485 A | 7/1996 | White et al. | |
| 5,850,256 A | 12/1998 | Corley | |
| 5,856,842 A * | 1/1999 | Tedesco ..................... | 348/14.16 |
| 6,450,662 B1 | 9/2002 | Hutchison | |
| 7,084,937 B2 | 8/2006 | Yu et al. | |
| 7,196,728 B2 * | 3/2007 | Campbell et al. ............. | 348/340 |
| 7,257,272 B2 * | 8/2007 | Blake et al. ................... | 382/275 |
| 7,697,053 B2 * | 4/2010 | Kurtz et al. ............. | 348/333.01 |
| 7,714,923 B2 * | 5/2010 | Cok et al. ................. | 348/333.01 |
| 7,808,540 B2 * | 10/2010 | Cok ......................... | 348/333.01 |
| 2003/0071932 A1 * | 4/2003 | Tanigaki ........................ | 349/61 |
| 2005/0046768 A1 | 3/2005 | Wu | |
| 2005/0052402 A1 | 3/2005 | Kitano et al. | |
| 2008/0106591 A1 * | 5/2008 | Border et al. .............. | 348/14.01 |

FOREIGN PATENT DOCUMENTS

WO     2006/040574     12/2007

OTHER PUBLICATIONS

Mitsubishi Electric Develops the World's First "Reversible LCD", Capable of Displaying Imagery on Both Its Front and Rear Surfaces—No. 2325 (3 pages).

* cited by examiner

*Primary Examiner* — Justin P Misleh

(57) ABSTRACT

A method and combined video display and camera system are disclosed. In one embodiment, the system comprises a first sheet and a second sheet oriented parallel to the first sheet, the second sheet including a light diffuser. A light source is placed along an edge of the second sheet, wherein the second sheet diffuses light generated by the light source. One or more cameras are placed behind the second sheet to capture an image through the second sheet and the first sheet.

15 Claims, 8 Drawing Sheets

CAMERA PLACED BEHIND A DISPLAY WITH A TRANSPARENT BACKLIGHT

The present application claims the benefit of and priority to Indian Provisional Patent Application No. 1300/MUM/2005 entitled "A Combined Video Display and Camera System with the Camera Behind the Display" and filed on Oct. 17, 2005.

FIELD OF THE INVENTION

The present invention relates to electronic devices. More particularly, the invention relates to a combined video display and camera system.

BACKGROUND

In video conferencing, two people communicate audio-visually. Each person is near a video conferencing terminal having a camera and a display. The camera captures the image of the person, which is transmitted to the distant person. The image of the distant person, is displayed on the display. Each person in the video conference is looking at his or her display to view the image of the other person. The camera is usually placed somewhere near the display. Since the person is looking at the display, the image captured by the camera is of the person looking away from the camera at the display. Each person is, thus unable to maintain eye contact. Absence of eye contact during a conversation greatly reduces the effectiveness of communication.

Many prior art systems use a two-way mirror, also called a half silvered mirror or beam splitter. A two-way mirror simultaneously reflects some light and passes some light. FIG. 1 illustrates a prior art video conferencing system. A conferee 102 views the display 108 reflected in mirror 104 while the camera 106 captures images of the conferee 102. The image is captured from the same position that the conferee 102 is looking at. Teleprompters function this way.

Another prior art video conferencing system uses a terminal equipped with a beamsplitter for reflecting an image generated by a video display so that only the reflection and not a direct view of the display is seen by the conferee. The camera is positioned behind the viewing side of the beamsplitter to capture the conferee's image through the beamsplitter. The direct view of the display is blocked by an image blocking film applied between the beamsplitter and the display. Blocking the direct view of the video display greatly improves teleconferencing by eliminating the distraction of simultaneously viewing both the video display and the reflection of the display.

Prior art systems are quite bulky, especially when compared to modern display systems or modern teleconferencing systems. These systems waste a lot of energy, since a large amount of the energy radiated by the display is wasted since it goes through the two-way mirror.

Many prior art systems compute a three-dimensional model of the conferee. Then the model is used to render an image of the conferee as if a camera were placed just behind the screen. The three-dimensional model is computed from multiple views of the conferee captured by cameras near the display, or by illuminating the conferee using light of a particular known pattern, and using the data pertaining to the illumination caused by the light.

In another prior art system, the three-dimensional model is not computed, but the final virtual view from the direction of the display is estimated by visual flow interpolation techniques. All these methods are computationally expensive. Furthermore, they do not perfectly capture the required image, but just estimate it. Also, the closer the viewer is to the display, the larger the disparity between the images of the conferee captured by the various cameras, and the harder it is to compute an accurate three-dimensional model of the conferee. Also, such approximation models falter under improper lighting conditions and improper viewing conditions such as the presence of particulate matter or obstructions.

A prior art method for achieving eye-contact in a video conferencing situation uses a camera placed directly in the line of sight between the conferee and the display. Though a correct image of the user may be captured this way, the visual obstruction of the camera is not comfortable to the conferee.

An attachment mechanism removably secures the camera to a screen portion of a display screen such that the camera is disposed between the display screen and a person engaged in videoconferencing. The attachment mechanism can be a suction cup, strips of double-sided tape, or magnets. Magnetic force between the first and second magnets removably secures the camera to a screen portion of the flat panel display.

Other prior art systems use projection systems and are bulky in nature. Furthermore, these systems do not offer complete isolation of the camera sensor from the light due to the display, causing unwanted glare. Also, in many situations flat panel displays are preferred to projection systems due to image quality reasons.

SUMMARY

A method and combined video display and camera system are disclosed. In one embodiment, the system comprises a first sheet and a second sheet oriented parallel to the first sheet, the second sheet including a light diffuser. A light source is placed along an edge of the second sheet, wherein the second sheet diffuses light generated by the light source. One or more cameras are placed behind the second sheet to capture an image through the second sheet and the first sheet.

The above and other preferred features, including various details of implementation and combination of elements are more particularly described with reference to the accompanying drawings and pointed out in the claims. It will be understood that the particular methods and systems described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles of the present invention.

DETAILED DESCRIPTION

A method and combined video display and camera system are disclosed. In one embodiment, the system comprises a first sheet and a second sheet oriented parallel to the first sheet, the second sheet including a light diffuser. A light source is placed along an edge of the second sheet, wherein the second sheet diffuses light generated by the light source. One or more cameras are placed behind the second sheet to capture an image through the second sheet and the first sheet.

According to one embodiment, the present system and method captures images with a camera from almost the same location as a display is displaying another image. The system uses optical, electrical, electronic and optionally computational elements.

One embodiment of the invention comprises a flat-panel screen which displays images picture by adjusting the optical transparency of its individual pixels. The display is illuminated using a backlight which diffuses light from a light source such that the light passes through the flat panel screen and the user sees the images. A camera captures an image of the user and his/her surroundings through the flat panel screen and backlight. An image correction system and method is employed on the captured image to reduce or eliminate the effects of displaying an image on a screen, backlight and illumination on the captured image. This corrected image is available at output 214.

Almost all computers have displays, and many have web cams or other image capture mechanisms. The present system works as both of these, in a more compact form. Many present day mobile phones have both a display and a camera. Many mobile phones have a camera directed towards the viewer of the display of the mobile phone. The present system allows mobile phones to be more compact, and enable eye-to-eye teleconferencing in a mobile phone.

In one embodiment, the system may be used for reading text while appearing to look straight at the camera. The present system allows energy conservation in such applications, saves studio space in traditional uses, and allows alternate uses such as web casting news or other programs from a personal computer, or reading text from the camera panel while shooting at an outdoor location.

The present system may be used to conceal a camera behind a display or a patch of illumination, for surveillance purposes. For example, this could be used to place a camera inside the display of an automatic teller machine.

The present system may also act as a mirror, by presenting the captured image on the display. The image may be flipped left-to-right to emulate a normal mirror, or it may not be flipped.

Figure 1:
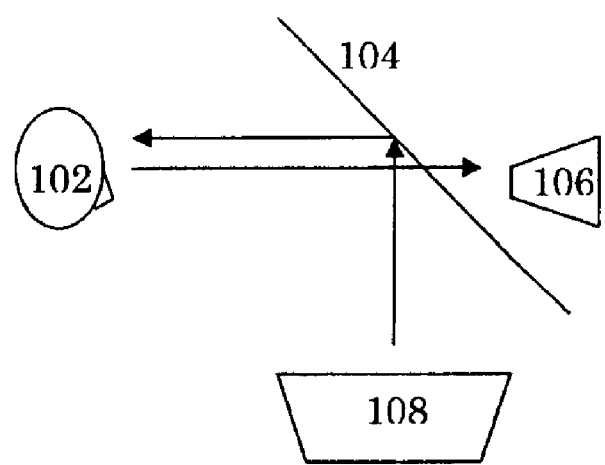
FIG. 1 illustrates a prior art video conferencing system.
Figure 2:
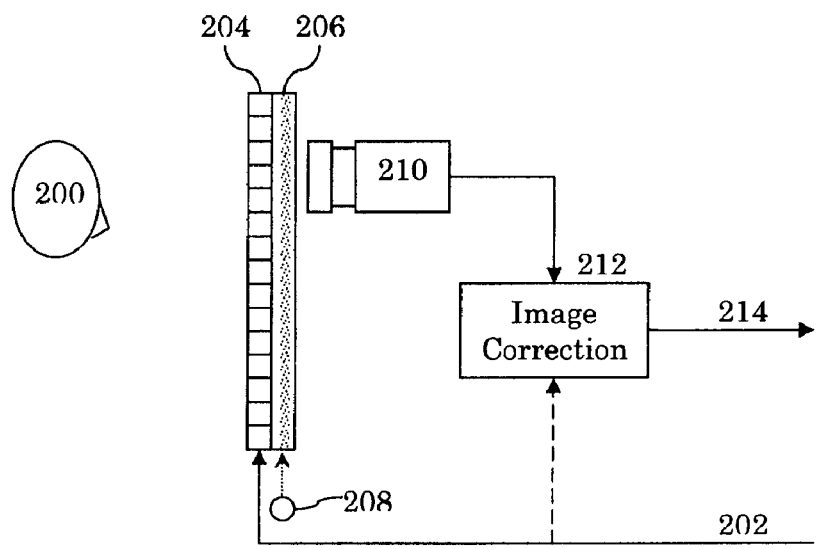
FIG. 2 illustrates a block diagram of an exemplary combined camera and display system, according to one embodiment of the present invention.

FIG. 2 illustrates a block diagram of an exemplary combined camera and display system 299, according to one embodiment of the present invention. An image is displayed on a flat-panel screen 204. Flat panel screen 204 displays the picture by adjusting the optical transparency of its individual pixels. Screen 204 is illuminated using a backlight 206 which diffuses light from a light source 208 such that the light passes through the flat panel screen 204 to the user 200 who sees a picture. Camera 210 captures an image of the user 200 and his/her surroundings through screen 204 and backlight 206. An image correction system 212 is employed to reduce or eliminate the effects of the image displayed by the display 204 and backlight 206 on the image captured by the camera 210.

Alternating Display and Capture Periods

The backlight 206 behind screen 204 scatters light into the camera 210 and interferes with its operation. The light scattered into the camera 210 is predictable and may be corrected with image correction system 212. A camera with high sensitivity and accuracy is used because the scattered light, may be more powerful than the light that is intended to be captured in the camera 210. The scattered light (being noise) decreases the signal-to-noise ratio of the captured image.

System 299 displays images and captures images in separate periods of time, where the image display period and image capture period occurs in a rapidly alternating sequence. The frequency of alternating periods is so fast that the eye observing the screen does not perceive a flicker. The human eye cannot perceive flickers which occur at a rate faster than about 40 Hz. This principle is used in movies and cathode ray tube televisions.

Figure 3:
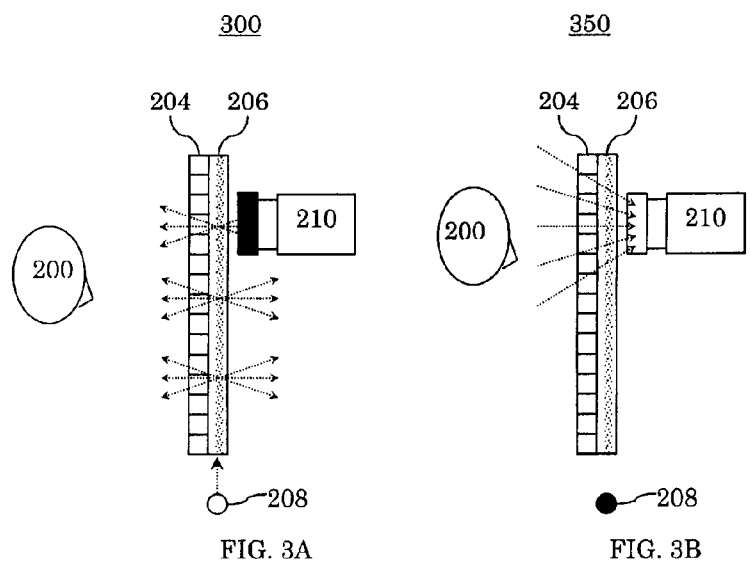
FIG. 3A illustrates a block diagram of an exemplary video system during the time period when an image is displayed, according to one embodiment of the present invention.
FIG. 3B illustrates a block diagram of an exemplary video system when an image is captured according to one embodiment of the present invention.

FIG. 3A illustrates a block diagram of an exemplary video system 300 when an image is displayed, according to one embodiment of the present invention. Light source 208 causes light to fall on the backlight panel 206. This light is scattered by the backlight panel 206. When the scattered light is viewed through the screen 204, the image displayed on the screen 204 is perceived. Camera 210 is not recording an image during this time period.

FIG. 3B illustrates a block diagram of an exemplary video system 350 when an image is captured according to one embodiment of the present invention. Light source 208 is turned off, such that no light is scattered by the backlight panel 206. The camera 210 records an image 200 during this time through the screen 204 and the backlight panel 206. Since the light source 208 is turned off, no light used to display the image enters the camera 210, so the camera 210 gets a clear view of the captured object 200.

The light source 208 cycles between off and on (or between light output and no light). This light source 208 may be a fluorescent light tube. Fluorescent lights have the ability to alternate quickly between outputting light and not outputting light. Fluorescent lights are used to light flat panel display backlights. These fluorescent lights cycle between the light and dark states at a rate as high as 1000 Hz. It is possible to vary the duty cycle of the light and dark states, (i.e. it is possible to electronically control what fraction of the total time the light source is in the light state, sourcing light into the backlight 206). In an alternate embodiment, the light source 208 is one or more LED light sources. The cycling between light and dark states is achieved by turning the LED light sources on and off in rapid succession. Incandescent lights are also a very good light source, but incandescent lights cannot switch between light and dark states very fast. Illumination from an incandescent light sources may be caused to alternate between light and dark by placing an obstruction between light source 208 and backlight 206. The obstruction switches at a high speed between transparent and opaque to cause the backlight 206 to glow and not glow. Such an obstruction may be a mechanical shutter, implemented as a rapidly opening and closing aperture or as a spinning disc with holes. Another system causing a periodic obstruction is an LCD panel which switches at a fast speed between opaque and transparent. Continuous light sources such as incandescent light are sometimes preferred in lighting systems because they produce a much more natural and even light spectrum. Other continuous systems such as arc lights produce a high power output. A light source and its driving electronic circuitry are arranged such that the fraction of time for which the light source is on is as small as possible. This allows for maximum time to be allotted to capturing the image with the camera 210, and thus increases the sensitivity of the camera 210. LED light sources exist which source a very high amount of light energy for a very small duty cycle.

The camera 210 continuously switches between image recording mode and a mode wherein the light falling on the input aperture of the camera 210 has no effect on the camera 210, hereinafter referred to as non-recording mode. In one embodiment, this is achieved by using an obstruction near the input aperture of the camera 210 which alternates at a high frequency between transparent and opaque. If the camera 210 is an electronic camera, including a CCD camera or other such electronic device, another way of achieving an alternating obstruction is to use an electronic shutter. When electric potential is applied to the pixels of the image recording plane of the electronic camera 210, photons captured by the camera 210 are converted to electrons which are accumulated in physical spaces corresponding to each pixel of the picture. When this electric potential is removed, light falling on the recording plane has no effect. High frequency switching between recording and non-recording mode for an electronic camera 210 may be achieved by alternately applying and removing said electric potential.

The time between application and removal of the electric potential is an exposure. After the electric potential is applied and removed, the amount of charge accumulated in each pixel position is recorded that serves as an electronic description of the image. In one embodiment, after each application and removal of the electric potential, the charge accumulated in each pixel is recorded, i.e. an image is captured per exposure. For very short exposures it may not be possible to accumulate enough photons in a single exposure to accurately estimate the intensities at each point. In such a case, a single image is recorded after many exposures. Thus, electric potential is applied and removed many times, causing the camera to switch between recording and non-recording mode many times. After a certain fixed number of exposures, the amount of charge accumulated at each pixel position is measured and recorded. Choosing the number of exposures after which an image is recorded achieves exposure control, i.e. controlling the total amount of time for which the pixels are exposed for the capturing of a single image. In an alternate embodiment, choosing the exposure time of each exposure achieves exposure control. Exposure control is a feature in cameras to achieve more control over the image recorded. Automatic exposure control is achieved by choosing the exposure time based upon the intensity of the previous image captured, or other light measurements. Cameras capture images at a fixed image rate. After the requisite number of exposures for the capture of an image occurs, the camera shutter is kept in non-recording mode until the next image is recorded. During this extended non-recording mode, the charge accumulated at each pixel position is recorded.

Non-CCD cameras, non-electronic cameras and film based cameras may also be used. In the case of a film based camera, to achieve multiple exposures per image capture, the film frame is advanced after switching multiple times between recording and non-recording mode. This may require, similar to the case of the electronic camera, fast switching between the recording and non-recording mode, followed by an extended non-recording mode during which the film is advanced. Two serially placed apertures may be used—one for keeping the light of the backlight from entering the camera, and one to allow frame advance.

The switching between light and dark of the light source 208 and the switching between recording and non-recording mode of the camera 210 are synchronized such that the camera 210 is in the recording mode only when the light source 208 is dark. Both the camera and light source are controlled by a single electronic oscillator and control circuit. In the case that the alternating apertures for the light source and camera are discs with holes, both the discs are driven by a single mechanical shaft. Alternatively, a single disc with holes is provided, and positions of the light source and camera are arranged such that either the light source is on or the camera is recording.

A fluorescent or LED light source may be used together with an electronic camera and driving both of these devices using a single electronic circuit having a single oscillator controlling both these devices. According to one embodiment, a single electronic circuit having a single oscillator controls both the light source (either, fluorescent or LED) and the electronic camera.

To further reduce costs, one may substitute a light source which can alternate between light and dark, but whose dark period is not a small fraction of the total time, but a large fraction of it. In this case, the synchronization mentioned above is adjusted such that a minimum possible light from the light source 208 enters the camera 210.

In another embodiment, if the aperture of the camera 210 is very small, the illumination light entering the camera 210 may be of a tolerable limit, and its effects are nullified by the image correction system 212.

The Backlight for the Display

Backlight 206 of the display 300 allows light incident at a particular angle to disperse in all directions. Light incident in other angles, though, is almost completely passed through the backlight without any change.

Figure 4:
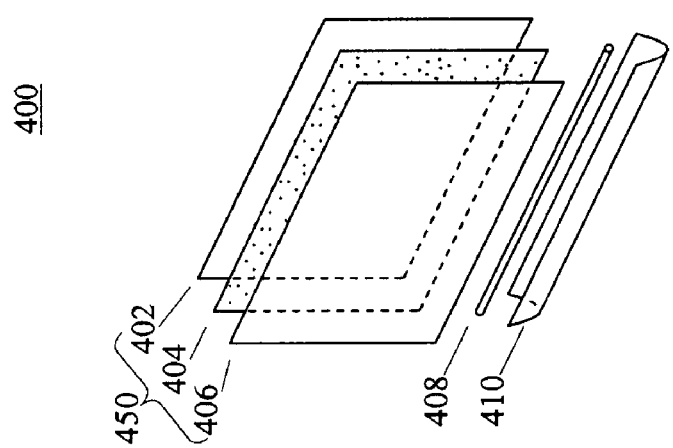
FIG. 4 illustrates a block diagram of an exemplary light guide, according to one embodiment of the present invention.

FIG. 4 illustrates a block diagram of a light guide 400, according to one embodiment of the present invention. Core 404 of light guide 400 has a sparse distribution of light dispersing particles (core 404 may also be referred to as diffuser 404). The diffuser 404 is made of metallic, organic, or other powder or pigment, which reflects light incident on it. Alternately, diffuser 404 may be constituted of small transparent particles or bubbles, which disperse light by refraction, reflection at the boundary, by diffusion inside the particle, or by total internal reflection. The light from the primary light source 408 is dispersed over the entire surface of the light guide 400, and will exit both its large faces. Light guide 400 is primarily transparent and clear when viewed from one of its faces. Light is focused using a focusing reflector 410.

Figure 5:
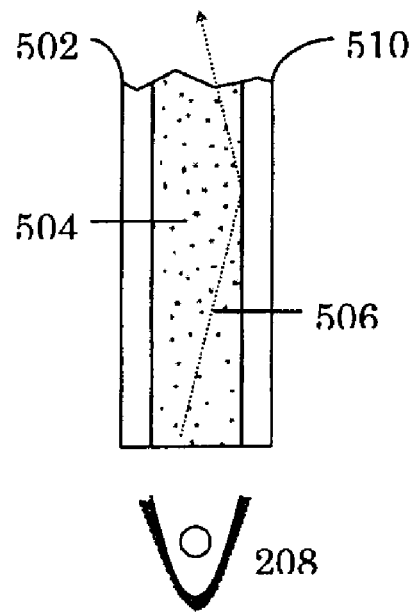
FIG. 5 illustrates a diagram of an exemplary backlight, according to one embodiment of the present invention.

FIG. 5 illustrates a diagram of an exemplary backlight, according to one embodiment of the present invention. Light from a light source 208 primarily falls on one edge of the middle layer 504 of backlight 208. An optical apparatus consisting of mirrors and lenses may be used so that the maximum amount of light from light source 208 enters the transparent sheet 504 at the required angle. An exemplary light ray 506 emanating from the light source 208 is depicted. This light ray suffers total internal reflection at the interface between the transparent sheet 504 and the other transparent sheet 510 of lower refractive index. The light ray will suffer further internal reflection and thus remain completely within transparent sheet 504. Thus, most of the light from the light source 208 is dispersed by backlight sheet 206. Also, since cladding sheets 502 and 506 are completely transparent, and middle sheet 504 is transparent with a very light concentration of dispersive particles backlight sheet 206 is almost completely transparent to light entering the large face of the sheet. Thus, the camera 210 views the backlight 206 as almost completely transparent.

It is beneficial to use a non-uniform concentration of dispersive particles such that a uniform illumination is achieved. In the case of a single light source, the concentration of dispersive particles is lesser near the light source, and more at the other end of the middle sheet 504 of the backlight 206. The camera is placed behind a part of the backlight 206 which has lesser concentration of dispersive particles. Using non-uniform concentration, all the light due to the light source can be dispersed by the backlight.

The Image Correction System

Image correction system 212 corrects defects in the image captured by camera 210 through the flat panel display 204 and backlight 206. The camera 210 is located very close to the flat panel display 204. A very few pixels of the flat panel display 204 affect the image captured by camera 210. Furthermore, the pixels of the flat panel display 204 are out of focus at the image capturing plane of the camera 210. The object to be captured by the camera 210, being further away, is in focus at the image capturing plane of the camera 210. The effect of the occlusion of the flat panel display 204 on any particular pixel of the image captured by camera 210 is a multiplicative change in intensity. The actual intensity at the particular pixel is multiplied by a function of the occluding pixels. Furthermore, since the occluding pixels are out of focus, more than one occluding pixel will contribute to the occlusion of each captured image pixel. The amount of occlusion suffered by each pixel of the captured image, henceforth called the occlusion map, has a specific relation to the occluding pixels on the flat panel display 204. In an embodiment, this relation is approximated as a linear relation that is evaluated by performing experiments whereby a single pixel on the screen 204 is opaque and all other pixels are transparent. The effect of a single screen pixel on the occlusion map is recorded. Knowing the occlusion map for each screen pixel, the occlusion map for any setting of values for the relevant screen pixels is evaluated. In an alternate embodiment, such linear relation is further characterized as a shift-invariant relation. Thus various fast convolution methods such as the methods based on the Fast Fourier Transform may be used to calculate the occlusion map from the values of the relevant screen pixels. Once the occlusion map is known, the occlusion suffered by each captured pixel is known, and the original value of the screen pixel is determined.

There are many flat panel displays which have statically opaque elements, such as pixel boundaries and transistors. Statically opaque elements have a static additive effect on the occlusion map. The effect is estimated experimentally, by presenting the camera 210 with a flat intensity of light, and keeping all the screen pixels transparent. The known additive effect of statically opaque elements are added into the occlusion map to generate a composite occlusion map. The map reflects changes due to static as well as dynamic elements. The effect of the occlusion may then be nullified by dividing by the occlusion map. The defects introduced into the image captured by the camera 210 by the flat panel screen 204 are thus removed.

There are two kinds of defects introduced by the backlight 206 into the image captured by the camera 210. The first of these defects is a slight dispersion of the light rays before the image is captured. In an alternative embodiment, to get a clear picture, the defect may be removed by standard deconvolution or linear system inversion. As a simple approximation, all the pixel values may be added to estimate the total dispersed light. The amount of this light, approximating the total light entering the camera 210 is further estimated to uniformly affect all pixels of the picture, and thus, a single uniform value is subtracted from each pixel. This improves the contrast of the captured picture by reducing the slight haze introduced by backlight 206.

The second defect introduced by backlight 206 is dispersion of light from light source 208 into camera 210. Image correction system 212 corrects defects by subtracting the intensity at each pixel that is introduced by the scattering of the backlight. This is estimated per picture as a function of the time overlap between the display phase and capture phase.

Improving Sensitivity of the Camera in the Presence of Occlusion

While the camera 210 is capturing the image, the image is occluded by the transparency setting of various screen pixels which are in front of the camera aperture. This occlusion causes darkness at the camera 210. Though the darkness can be overcome by amplification, the amplification causes an equivalent amplification in the noise including quantization noise, the stochastic nature of the photons falling on the pixel area, the stochastic nature of the photoelectric effect, thermal and electrical noise, and other similar causes of sensor noise. This decreases the accuracy and sensitivity of the captured image.

In one embodiment of the invention, some or all of the screen pixels in the path of light to the camera 210 are made transparent during the time period when the light source 208 is in 'off' mode, i.e when the display is not lighted. The original transparency values of the pixels are restored before the light source 208 starts sourcing light again. If a new image is to be displayed on the screen 204, the pixels are now set to the new transparency values. Thus, in the time periods when an image is being displayed on the screen, the screen pixels are set to transparency values that result in the correct image being displayed, and in the time periods when an image is being captured by the camera, the screen pixels are set to a transparency value that cause more light to fall on the image plane of the camera 210.

If screen 204 is a liquid crystal display (LCD), the changes in transparency are made by changing the charges stored at those pixel values. LCD pixels are slow to respond to changes in electric potential. Hence, the timing of these changes is accurately adjusted such that the maximum average transparency during the capture phase is possible. The frequency of switching between display and capture periods is kept slow enough to allow for the LCD pixels to switch to transparent and switch back to their original setting. Also, setting the duty cycle of the light source 208 such that a small fraction of the time is spent in the display period leaves more time for switching. Even if complete transparency is not achieved, the average transparency value achieved for a particular pixel during the capture period increases, thus causing an increase in the sensitivity of the camera. If complete transparency is achieved, the image correction system 212 has to compensate for static occlusion, which is a very simple algorithm. If complete transparency is not achieved, there is some effect of the screen pixel values on the occlusion map. This effect not only depends upon the screen pixel values themselves but also upon the time of exposure of the camera 210, and the average transparency of the particular pixel during the exposure. This is calculated by the image correction system 212 and the occlusion map is calculated from these changed pixel values.

There are many methods of making a select set of pixels transparent on a flat-panel display, especially if the display is an LCD. For example, in matrix addressing, pixel values for a whole row of pixels are set at a time. An individual row is selected by a row enable wire that runs across the display. Multiple rows are made transparent in one operation by selecting multiple row enable wires. In systems using both row and column enables, a square area is selected to be made transparent in one operation by choosing the corresponding rows and columns to be enabled. Many LCD systems use a storage capacitor per pixel to store the charge which applies a given voltage across the liquid crystal pixel. Extra switching elements such as transistors may be used in the pixel to couple and decouple the liquid crystal from the charge stored in the capacitor. When the liquid crystal is decoupled from the charge, the pixel becomes transparent. Furthermore, coupling the liquid crystal to the capacitor causes the original transparency value to be restored. Usually, the voltage on one terminal of the storage capacitor or one end of the liquid crystal is varied, while the other end is kept constant. The voltage at the other end of the liquid crystal or storage capacitor is varied for the specified pixels or all pixels to turn the corresponding pixels transparent in a single operation without losing the voltages stored on the first end. When the voltage at the other end of the liquid crystal or storage capacitor is brought back to its original value, the original transparency values are restored.

In another embodiment of the invention, whenever the display and camera are used together, as during a teleconference, the brightness of a particular pixel on the display is not allowed to drop below a particular transparency level. This is achieved with the driving circuit of the flat panel display, or in software by the computer attached to the display. This guarantees a minimum sensitivity for the captured picture.

In yet another embodiment, the exposure time for obtaining a single image is varied to compensate for the loss of light due to occlusion. Such alteration of exposure time is usually controlled by the user, or by an automatic algorithm which adapts to the brightness level of the captured image. In one embodiment, the expected exposure time is multiplied by a factor derived from the advance knowledge of the average occlusion value that the captured image is going to suffer. The image correction system 212 corrects not only the defects due to the occlusion, but also due to the altered exposure time, the latter achieved by dividing by the same factor by which the actual exposure time is more than the expected exposure time, the division causing a reduction in the noise present in the image.

Improving the Energy Efficiency and Illumination Evenness of the Backlight

Figure 6A:
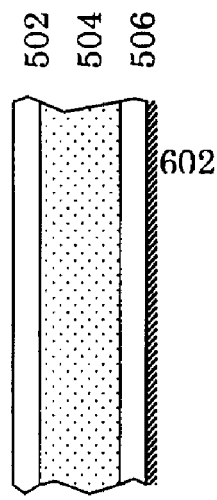
FIG. 6A illustrates a diagram of an exemplary backlight having a mirrored surface according to one embodiment of the present invention.

FIG. 6A illustrates a diagram of an exemplary backlight 600 having a mirrored surface according to one embodiment of the present invention. Since the screen 204 is only on one side of the backlight 206, half the light energy will be wasted if special care is not taken. The non-display end of the backlight 600 is augmented with a mirror 602, such that the energy dispersed in the direction opposite to the display direction is reflected in the direction of the display.

Figure 6B:
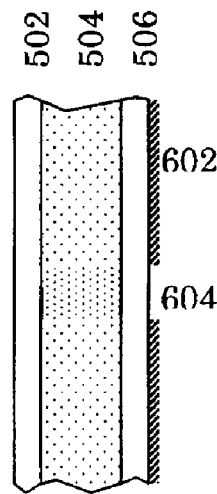
FIG. 6B illustrates a diagram of an exemplary partially mirrored backlight, according to one embodiment of the present invention.

If the mirror 602 is a complete mirror, light will not pass through it into the camera 210. One way to overcome this problem is to use a partially silvered mirror. Though the energy efficiency of the backlight is improved, the image received by the camera 210 is attenuated, thus adversely affecting the sensitivity of the camera 210. FIG. 6B illustrates a diagram of an exemplary partially mirrored backlight 650, according to one embodiment of the present invention. A break 604 in the mirror may be provided for such that there is no obstruction to the camera 210. To compensate for the loss in brightness in the local region of the break 604 in the mirror 602, a higher concentration of light scattering particles is used in the light scattering sheet 504 near the break 604 in the mirror 602. In an alternative embodiment, to avoid a discrete appearance, both the reflectivity of the mirror 602 and the concentration of light scattering particles is varied continuously such that the mirror 602 is completely transparent in the region of the aperture of camera 210.

The mirror 602 may produce highly specular reflections of objects on the other side of the display, which may make the display uncomfortable to view. This problem is overcome by making the mirror 602 a diffusing mirror, such that it has a glazed or brushed finish. In one embodiment, this is achieved by abrading the surface of transparent sheet 506 and depositing a metal on its surface. Alternatively, a light scattering sheet is used between mirror 602 and transparent sheet 506.

Figure 7A:
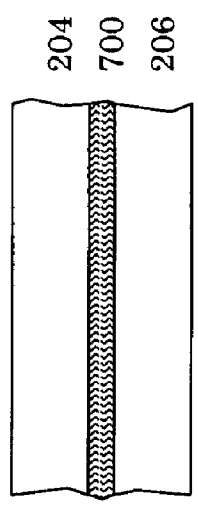
FIG. 7A illustrates a diagram of an exemplary display with a light diffuser, according to one embodiment of the present invention.

FIG. 7A illustrates a diagram of an exemplary display 710 with a light diffuser 700, according to one embodiment of the present invention. Many standard flat panel backlighting systems use a light diffuser 700 between backlight 206 and flat panel screen 204. This is for the purpose of achieving even illumination, and to reduce specular reflections from the mirror of the backlight. Diffuser 700 ensures more even illumination in the presence of the break 604 in the mirror. In one embodiment, the diffuser 700 is made such that the outgoing light suffers a small deflection in comparison with the incoming light. Since the distance between diffuser 700 and camera 210 (not shown in figure) is small, the light does not scatter much. The scattering caused by diffuser 700 is in the form of a convolution, and the effects are nullified by the image correction system 212.

Figure 7B:
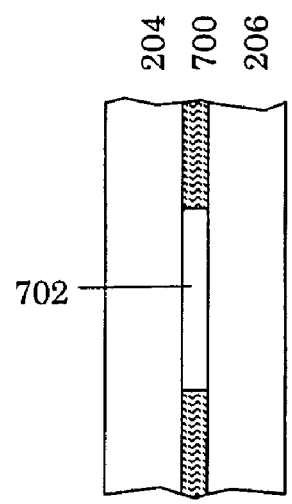
FIG. 7B illustrates a diagram of an exemplary display with a light diffuser, according to another embodiment of the present invention.

FIG. 7B illustrates a diagram of an exemplary display 750 with a light diffuser 700, according to another embodiment of the present invention. Display 750 scatters the light emanating from the backlight 206 while ensuring that the view of the camera 210 is not obstructed. Diffuser section 702 of the diffuser 700 is made out of material such that it can be turned into a transparent material or a light scattering material. During the period when the light source 208 is off and the camera 210 is capturing an image, the diffuser section 702, which is directly in the line of sight of the camera 210, is turned transparent. During the period when the camera 210 is in non-recording mode and the light source 208 is turned on, the diffuser section 702 is turned into a material that scatters light. Many materials switch from scattering light to passing light with the application or removal of an electric field. These materials make use of various forms of liquid crystals. For uniformity of the diffuser 700, the remaining sections of diffuser 700 are made out of the same material that 702 is made out of. Furthermore, the sections of diffuser 700 and 702 may be a single segment of the material. In this case, the segment 702 is differentiated by the proximity of transparent electrodes which create a field across the segment such that the segment turns transparent. Thus, when the field is turned off, there is no detectable boundary between the diffuser 700 and the segment 702 which is also now a diffuser.

Minimizing Flicker Due to Other Light Sources

It is frequently the case that the objects whose image is to be captured by the camera 210 are themselves illuminated by a regularly alternating external light source such as fluorescent light. Further, there is also the possibility of other displays within the field of view, these displays having their own frequencies of light emanation (both CRT and LCD displays exhibit this behavior). Such flickering light may cause a frequency aliasing effect when sampled through the high frequency capture periods of the camera 210. The effect of this aliasing on the captured images would be a low frequency oscillation in the illumination due to that particular light source.

In one embodiment of the present invention, switching between capture and display periods is synchronized with the illumination due to the alternating light source, preferably such that the present system is in the capture period at the same time that the alternating external light source is illuminating the object whose image is to be captured. This eliminates the aliasing effect, and has the added benefit of a large amount of the illumination reaching the camera 210. Synchronization may be achieved by synching with the alternating mains power, which is usually driving the switching of the external light source, or by using a phase locked loop to lock into the frequency of the light source. The phase locked loop may use a photo-sensor or feedback from the camera 210 to achieve phase lock. In another embodiment, the switching frequency is a multiple of the frequency of switching of the external light source, or vice versa.

In another embodiment, the aliasing effect is minimized by alternating between the capture and display periods at a very fast frequency compared to the frequency of switching the external light source off and on. Because of the higher sampling rate, the effect of aliasing is reduced. The residual aliasing effect causes a low frequency periodic change in the illumination of the captured image. Such periodic change is detected and cancelled out by the image correction system 212. The period of the frequency change is predicted by detecting the mains power frequency and subtracting the whole fraction of the switching frequency between the capture and display periods that are closest to it.

To minimize flicker from high frequency light sources, the sequence of alternating between capture and display periods is randomized. The amount of time the system remains in each of the two phases of displaying an image and capturing an image is decides randomly based on some random or pseudorandom sequence of numbers. In many cases, the amount of time the light source 208 can remain on is limited. In such cases the randomization relates to the period between two flashes of light from light source 208. The random sequence is arranged such that the average illumination of the display is the chosen average illumination for the display, such that no flicker is perceived by the human eye considering the principle of persistence of vision, and each image being captured is exposed for the requisite time. The randomization in the sequence breaks up the symmetry of sampling and greatly reduces the effects of aliasing.

Position of the Camera

The camera 210 is placed in a position closest to the expected location of the image of the remote conferee's eyes. Since the eyes of a human are located in the upper half of the head, and since usually head-and-shoulder images are most commonly transferred while video conferencing, the camera 210 is placed behind the upper part of the screen 204.

In another embodiment, multiple cameras may be placed behind the screen. These may generate a stereoscopic or multiple-view image of the subject and surroundings. Alternately, views from various cameras could be transmitted to various conferees in a multi-party video conference. The image captured by the camera closest to the image of a particular remote conferee will be transferred to that particular conferee. This will simulate eye contact for the remote conferee only when the present conferee actually looks at that particular remote conferee.

Figure 8:
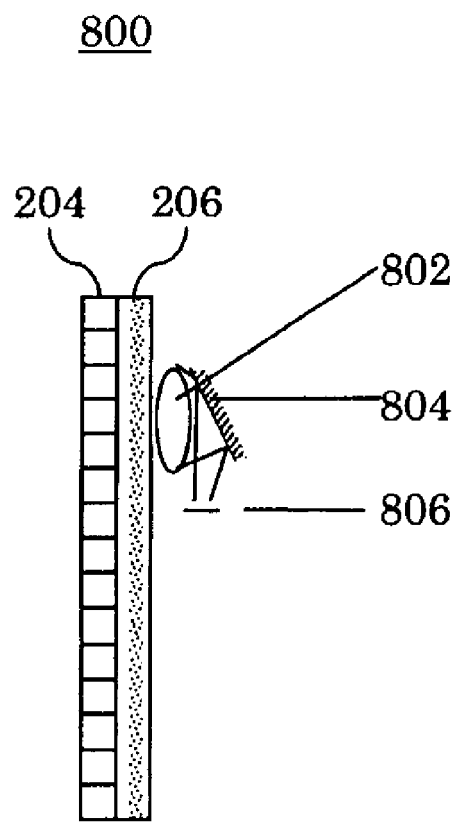
FIG. 8 illustrates a diagram of an exemplary display with a camera, according to one embodiment of the present invention.

FIG. 8 illustrates a diagram of an exemplary display 800 with a camera 802, according to one embodiment of the present invention. To reduce the bulk of the camera unit 802, a first object lens 802 may be used, followed by a mirror or prism arrangement 804 which reflects light into such a direction such that the bulk can be more easily accommodated with the body of the remaining display unit 800. Light is focused by an object lens 802 through a mirror 804 onto light sensing plane 806, which may be a charge coupled device (CCD) or other device that measures the intensity of light at various spots. Such bulk reducing arrangements are useful in desktop display applications as well as smaller applications such as mobile phones.

Security and Privacy

Since the camera 210 is an integral part of the video display unit, turning the camera in a different direction than the display is difficult. It may also be difficult to keep the display connected and yet disconnect the camera. To minimize the possibility of turning the camera on and capturing images unbeknownst to the user of the present invention, a simple electronic indication such as an LED indicator is provided on the front panel of the display whenever the camera starts capturing images.

Correcting for Non-Linerity of Capture and Display Mechanism

Many image display mechanisms and image capture mechanisms have a non-linear response. This causes the relation between occluding screen pixels and the occlusion mask to be non-linear, as well as the occlusion mask itself to be more complicated than a simple multiplier per pixel of the captured image. Though these relations are linear as far as the transparency values of the screen to the intensities at the camera pixels are concerned, the non-linear complications arise because the transparency of a screen pixel is not a linear function of the input pixel value, and because the pixel value recorded by the camera is not a linear function of the intensity incident at that pixel. To reduce or remove the non-linear effects, the image correction system 212 first operates on the captured image with the inverse of the non-linear function for the camera, to get a record pixel values which are linearly related to the intensities of light incident at those pixels. Also, before the occlusion map is calculated, the relevant pixels of the image to be displayed upon the screen are operated upon (computationally) by the same non-linear function as the non-linear function of the screen, to get an estimate of the transparency of each occluding pixel.

Complications Arising from Changing the Display Picture while Capturing Image

The timing of the system is arranged such that the occluding screen pixels are not changing their transparency values during a particular image capture. This is achieved by synchronizing the display refresh cycle and the camera frame capture cycle. In the case that the transparency values of the occluding pixels change during the capture of a single image, the occlusion map calculated by the image correction system 212 is calculated as some function (a linear-combination), of the occlusion maps due to the first and the second setting of pixels on the screen.

Capturing and Displaying Color Images

To display color images, color filters are used on individual pixels of the screen 204. To capture color images, color filters are applied to individual pixels of the camera 210. When viewed through a camera pixel of a particular color, pixels of different color than the color of the camera pixel seem much darker than pixels of the same color. This effect on perceived transparency of same and different colors is used in the calculation of the occlusion map by image correction system 212.

A method and combined video display and camera system are disclosed. It is understood that the embodiments described herein are for the purpose of elucidation and should not be considered limiting the subject matter of the present patent. Various modifications, uses, substitutions, recombinations, improvements, methods of productions without departing from the scope or spirit of the present invention would be evident to a person skilled in the art.

We claim:

1. A video display and camera system, comprising:
   a first sheet;
   a second sheet oriented parallel to the first sheet, the second sheet including a light diffuser;
   a light source placed along a first face of the second sheet, the first face not being a large face of the second sheet, such that light from the light source primarily enters the second sheet through the first face and the light from the light source that is not diffused by the light diffuser suffers total internal reflection within the second sheet; and
   one or more cameras placed behind the second sheet to capture an image through the second sheet and the first sheet.

2. The system of claim 1, further comprising a mirror between the second sheet and the one or more cameras, wherein the mirror is substantially transparent in an area in front of the one or more cameras.

3. The system of claim 2, wherein the second sheet includes a concentration of light scattering particles in the area in front of the one or more cameras, which is greater than the concentration of light scattering particles in an adjoining area of the second sheet which is not in front of the one or more cameras.

4. The system of claim 1, wherein the one or more cameras are configured to capture the image during a capture period and not capture the image during a display period.

5. The system of claim 4, wherein the second sheet includes light dispersing particles that minimally scatter and absorb light traveling towards the face of the second sheet during both the display period and the capture period.

6. The system of claim 4, wherein the capture period and the display period overlap with each other.

7. The system of claim 4, wherein the light source is configured to emit light during the display period and not emit light during the capture period.

8. The system of claim 7, wherein the light source is one of a fluorescent light and one or more LEDs.

9. The system of claim 7, further comprising a light blocking mechanism that blocks the light from the light source during the capture period.

10. The system of claim 1, wherein the first sheet is a display and the second sheet is a backlight.

11. The system of claim 1, wherein the image captured by the one or more cameras is displayed on the first sheet.

12. The system of claim 1, further comprising an image corrector that corrects defects in the image caused by the second sheet.

13. The system of claim 1, further comprising an image corrector that corrects defects in the image caused by the first sheet.

14. The system of claim 1, further comprising an element that diffuses light located between the first sheet and the second sheet, wherein the element that diffuses light is configured to be transparent when the one or more cameras is capturing the image.

15. The system of claim 1, further comprising a user perceivable capture indicator that indicates when the one or more cameras are capturing the image.

* * * * *